(12) United States Patent
Delaney

(10) Patent No.: US 6,375,414 B1
(45) Date of Patent: Apr. 23, 2002

(54) SEAL FOR A PUMP, AND A PUMP COMPRISING THE SEAL

(75) Inventor: George J. Delaney, Clarenbridge (IE)

(73) Assignee: Alcan International Limited, Ontario (CA)

( * ) Notice: Subject to any disclaimer, the term of this patent is extended or adjusted under 35 U.S.C. 154(b) by 0 days.

(21) Appl. No.: 09/402,177

(22) PCT Filed: Apr. 30, 1998

(86) PCT No.: PCT/IE98/00032

§ 371 Date: Sep. 30, 1999

§ 102(e) Date: Sep. 30, 1999

(87) PCT Pub. No.: WO98/49448

PCT Pub. Date: Nov. 5, 1998

(30) Foreign Application Priority Data

Apr. 30, 1997 (IE) ............................................... S970318

(51) Int. Cl.[7] ............................ F16J 15/00; F04D 29/08
(52) U.S. Cl. ........................ 415/111; 415/113; 415/131; 415/174.1; 415/174.2; 415/231
(58) Field of Search ................................. 415/111, 113, 415/131, 132, 173.2, 174.1, 174.2, 174.3, 230, 231; 277/346, 352, 370, 377, 390, 511

(56) References Cited

U.S. PATENT DOCUMENTS

| | | | |
|---|---|---|---|
| 3,511,185 A | 5/1970 | Haentjens | |
| 3,977,737 A | 8/1976 | Grzina | |
| 4,406,465 A | * 9/1983 | Rockwood et al. | ........ 277/96.1 |
| 4,509,773 A | 4/1985 | Wentworth | |
| 4,575,306 A | 3/1986 | Monnot | |
| 4,997,191 A | 3/1991 | Warner | |

FOREIGN PATENT DOCUMENTS

EP 213 888 3/1987

* cited by examiner

Primary Examiner—Christopher Verdier
Assistant Examiner—Richard Woo
(74) Attorney, Agent, or Firm—Sughrue Mion, PLLC

(57) ABSTRACT

A pump (1) for pumping a slurry comprises a pump housing (2) defining a pumping chamber (5) with an impeller (6) located therein for pumping the slurry from an axial inlet port (7) to a radial outlet port (8). The impeller (6) is carried on a pump shaft (10) which is in turn rotatably carried in a shaft carrier sleeve (18) in a carrier housing (12) which also carries the pump housing (2). The shaft carrier sleeve (18) and the pump shaft (10) are axially adjustable in the direction of the arrows A and B for adjusting an axial clearance gap (25) between the impeller (6) and the pump housing (2). A shaft seal (9) for sealing the pumping chamber (5) comprises a packed gland seal (42) and a rotating sealing ring (38) and a stationary sealing ring (39). A lubricating fluid cavity (40) is located between the packed gland seal (42) and the rotating and stationary sealing rings (38,39) for lubricating axially facing rotating and stationary sealing surfaces (52,58). The stationary sealing ring (39) is engageable with a shoulder (61) on the pump shaft (10) for urging the stationary sealing ring (39) along with the pump shaft (10) as the axial clearance gap (25) is being closed so that when the axial clearance gap (25) is being opened to the desired clearance width (x) the rotating and stationary sealing surfaces (52,58) are brought into sealing engagement with each other.

17 Claims, 3 Drawing Sheets

SEAL FOR A PUMP, AND A PUMP COMPRISING THE SEAL

Figure 1:
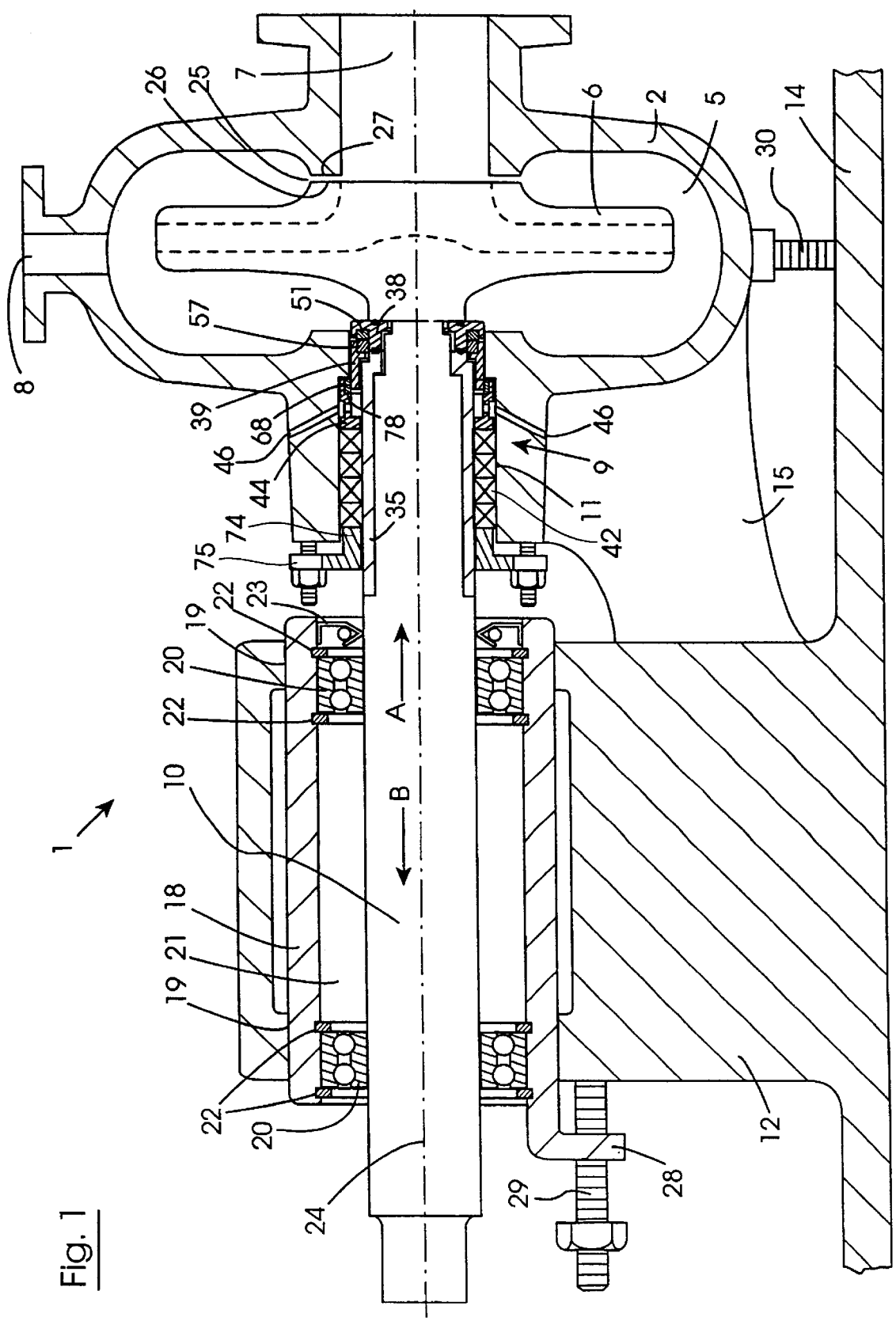

The present invention relates to a shaft seal for a pump or an agitator, and to a pump or an agitator, which for convenience are generally referred to hereinafter as a pump, comprising the shaft seal. In particular, the invention relates to a shaft seal for a pump of the type comprising a pump housing defining a fluid pumping chamber, an impeller located in the pumping chamber, a pump shaft carrying the impeller for rotating the impeller in the pumping chamber for pumping fluid through the pumping chamber, and a shaft accommodating bore extending through the pump housing into the pumping chamber for accommodating the pump shaft into the pumping chamber, the pump shaft being axially movable in the shaft bore for adjusting an axial clearance gap between a face of the impeller and an adjacent face of the pump housing in the pumping chamber. The respective adjacent faces of the impeller and the pump housing which define the clearance gap may extend radially relative to the rotational axis of the pump shaft or at an angle other than 90° to the rotational axis to define a frusto-cone.

Such pumps are well known, and in general, they are used for pumping slurry type fluids, typically of the type in which abrasive particular matter is entrained. Typically, they are of a type having an axial inlet and a radial outlet. The axial clearance gap between the impeller and the housing in the pumping chamber is typically provided at the axial end of the impeller adjacent the inlet. It is important that the axial clearance gap be maintained as small as possible in order to provide the maximum pressure drop across the impeller, while at the same time providing sufficient clearance for the impeller to rotate within the pumping chamber. Depending on the size of pump and the desired pressure drop across the impeller, and indeed, the fluid being pumped, the axial clearance gap between the impeller and the pump housing may vary up to approximately 1 mm.

However, the face of the impeller which defines the clearance gap in such pumps is prone to wear depending on the abrasive nature of the slurry fluid, and the rate of wear is a function of the degree of abrasiveness of the slurry material. As the face of the impeller wears, the axial clearance gap between the impeller and the pump housing opens up, thereby leading to an undesirable reduction in the pressure drop across the impeller. In order to avoid the need for replacing the impeller each time the axial clearance gap has opened up to an undesirable gap width, adjustment is provided in such pumps which permits the pump shaft to be axially movable within the shaft accommodating bore. Adjustment is undertaken by urging the pump shaft axially within the shaft bore until the face of the impeller abuts the adjacent face of the pump housing, thereby closing the axial clearance gap between the impeller and the pump housing. The axial clearance gap is then adjusted to the desired gap width by urging the pump shaft in the opposite axial direction an appropriate amount, thereby urging the impeller from the pump housing to open up the axial clearance gap to the desired gap width, typically up to 1 mm.

A shaft seal is provided around the pump shaft in the shaft bore for sealing the pumping chamber from the shaft bore. Such shaft seals, in general, comprise a combination of a stationary annular sealing bushing which is located in the shaft bore adjacent the pumping chamber and extends around the pump shaft, and a packed gland seal which is located spaced apart from the stationary sealing bushing downstream thereof relative to the pumping chamber. A spacing means typically a lantern ring is located in the fluid cavity for maintaining the packed gland seal spaced apart from the stationary sealing bushing. The stationary sealing bushing defines a circumferentially extending radially facing sealing surface which co-operates in sealing relationship with a corresponding radially facing circumferential sealing surface of the pump shaft. The packed gland seal defines with the pump shaft, the pump housing and the stationary sealing bushing an annular cavity which accommodates a pressurised lubricating fluid for lubricating the adjacent sealing surfaces of the stationary sealing bushing and the pump shaft. A charging port is provided into the fluid cavity for pumping the lubricating fluid under pressure into the cavity so that the pressure of the lubricating fluid in the fluid cavity is at a positive pressure relative to the slurry being pumped through the pumping chamber. This, thus, to a large extent prevents flow of slurry past the stationary sealing bushing, and permits the lubricating fluid to lubricate the adjacent sealing surfaces of the stationary sealing bushing and the pump shaft. The packed gland seal seals, the fluid cavity and prevents flow of the lubricating fluid between the pump shaft and the pump housing in a downstream direction relative to the pumping chamber.

Unfortunately, such arrangement of seals in such pumps are unsatisfactory. Firstly, although the lubricating fluid, which is typically water, is maintained at a positive pressure relative to the slurry being pumped in the pumping chamber, slurry does leak past the stationary sealing bushing, thereby causing wear both to the stationary sealing bushing and the shaft. In order to avoid having to replace the pump shaft at regular intervals, a wear sleeve is generally provide around the pump shaft adjacent the annular sealing bushing, which can be replaced when the annular sealing bushing is being replaced when wear becomes excessive. However, in order to replace the annular sealing bushing, it is necessary to disassemble the pump. The pump shaft must be withdrawn, and the entire seal around the pump shaft disassembled. The impeller must also be disassembled from the pump shaft to permit replacement of the wear sleeve. After the wear sleeve has been replaced on the pump shaft and the pump shaft and impeller assembled in the pump, the shaft seal again has to be assembled by inserting a new stationary sealing bushing, the lantern ring, and the packed gland seal. This is a time consuming task and also requires the services of skilled fitters, and thus, as well as being time consuming, is also expensive. An alternative sealing arrangement for sealing the pump shaft of such pumps includes the provision of a packed gland seal only. However, in such cases a shoulder must be provided within the shaft bore for acting as an inner abutment surface for the packed gland seal, and the radial clearance gap between the shoulder and the pump shaft must be relatively small to avoid the packing material of the packed gland extending beyond on the shoulder. In general, the radial gap opens up as a result of wear between the shoulder and the pump shaft caused by the slurry. Once the radial gap has opened sufficiently, the gland packing material commences to extrude between the shoulder and the pump shaft into the pumping chamber. This, thus, reduces the sealing pressure in the packed gland, thereby leading to slurry leakage past the packed gland seal. Further tightening of the packed gland seal merely exacerbates the problem, since it extrudes further material from the packed gland seal between the shoulder and pump shaft, and also increases frictional resistance on the pump shaft. This is undesirable. A similar problem can arise with a shaft seal of the type described above which comprises a stationary sealing bushing and a packed gland seal spaced apart from the stationary sealing bush when the slurry being pumped leaks into the lubricating fluid cavity. Such leakage of slurry into the lubricating fluid cavity causes wear between the pump shaft and the lantern ring, thereby permitting the packing material of the packed gland seal to extrude between the lantern ring and the shaft.

There is therefore a need for a shaft seal for such a pump, and indeed, for any other type of pump which overcomes these problems, and there is also a need for a pump comprising such a shaft seal.

The present invention is directed towards providing such a shaft seal and a pump.

According to the invention, there is provided a shaft seal for a pump of the type comprising a pump housing defining a fluid pumping chamber, an impeller located in the pumping chamber, a pump shaft carrying the impeller for rotating the impeller in the pumping chamber for pumping fluid through the pumping chamber, and a shaft accommodating bore extending through the pump housing into the pumping chamber for accommodating the pump shaft into the pumping chamber, the pump shaft being axially movable in the shaft bore for adjusting an axial clearance gap between a face of the impeller and an adjacent face of the pump housing in the pumping chamber, the shaft seal comprising a stationary sealing ring for mounting in the shaft bore and having a stationary sealing surface, a rotating sealing ring for mounting on the pump shaft and having a rotating sealing surface for co-operating with the stationary sealing surface for forming a seal from the pumping chamber between the pump shaft and the pump housing in the shaft bore, wherein the stationary and rotating sealing surfaces face in respective generally axial directions opposite to each other, and one of the stationary sealing ring and the rotating sealing ring is axially movable relative to the corresponding one of the pump housing and the pump shaft, and a means is provided for axially moving the movable one of the stationary sealing ring and the rotating sealing ring with the other of the stationary and the rotating sealing rings during axial movement of the pump shaft and the pump housing relative to each other for adjusting the axial clearance gap in the pumping chamber between the impeller and the pump housing so that on the relative axial movement of the pump shaft and the pump housing for opening the axial clearance gap to the desired gap width, the respective stationary and rotating sealing surfaces are brought into sealing relationship with each other.

In one embodiment of the invention, the means for moving the movable one of the stationary sealing ring and the rotating sealing ring is provided for moving the said movable sealing ring with the other sealing ring as the relative axial movement of the pump shaft and the pump housing is in a direction for closing the axial clearance gap between the impeller and the pump housing.

In another embodiment of the invention, the means for moving the movable one of the stationary sealing ring and the rotating sealing ring is provided for moving the movable sealing ring a sufficient distance with the other sealing ring so that on relative axial movement of the pump shaft and the pump housing to open the axial clearance gap between the impeller and the pump housing to the desired gap width, the respective stationary and rotating sealing surfaces are brought into the sealing relationship with each other.

Preferably, the means for moving the movable one of the stationary and rotating sealing rings comprises respective first and second abutment means for co-operating with each other for moving the movable one of the stationary and rotating seal rings with the other sealing ring on relative axial movement of the pump shaft and the pump housing for closing the axial clearance gap between the impeller and the pump housing, the first abutment means being provided on the movable one of the stationary and rotating sealing rings, and the second abutment means being located on the one of the pump housing and the pump shaft on which the other of the sealing rings is mounted.

In one embodiment of the invention, the stationary sealing ring is axially movable in the shaft bore.

Preferably, the first abutment means defines an axially facing first abutment surface on the stationary sealing ring, and the second abutment means defines a second axially facing abutment surface on the pump shaft facing in the general direction of axial movement of the pump shaft for closing the axial clearance gap between the impeller and the housing for abutting the first abutment surface when the pump shaft is moved in the axial direction for closing the clearance gap between the impeller and the pump housing.

Advantageously, the first abutment surface extends circumferentially around the stationary sealing ring, and preferably, the first abutment surface is defined by an annular flange extending inwardly from the stationary sealing ring.

Advantageously, the second abutment surface extends circumferentially around the pump shaft, and preferably, the second abutment surface is defined by a step change in the diameter of the pump shaft.

In one embodiment of the invention, the second abutment surface is defined by a sleeve rigidly mounted on the pump shaft.

In one embodiment of the invention, the spacing between the respective first and second abutment surfaces when the stationary and rotating sealing surfaces are in sealing relationship should not exceed the desired gap width of the axial clearance gap between the impeller and the pump housing.

In another embodiment of the invention, the stationary sealing ring comprises a stationary seal carrier ring for carrying an annular stationary seal. Preferably, the annular stationary seal is mounted in the stationary seal carrier ring.

In another embodiment of the invention, the rotating sealing ring comprises a rotating seal carrier ring for carrying an annular rotating seal. Preferably, the annular rotating seal is mounted in the rotating seal carrier ring.

In a further embodiment of the invention, a packed gland seal is provided for locating in the shaft bore spaced apart from the stationary and rotating sealing rings, the packed gland seal defining with the pump housing, the pump shaft and the stationary and rotating sealing rings an annular fluid cavity for a lubricating fluid for lubricating the stationary and rotating sealing surfaces of the respective stationary and rotating sealing rings, the annular fluid cavity being located on the downstream side of the stationary and rotating sealing rings relative to the pumping chamber.

In one embodiment of the invention, an access means is provided for pressurising the lubricating fluid in the fluid cavity so that the lubricating fluid has a positive pressure relative to the fluid in the pumping chamber.

Preferably, a spacing means is provided for spacing the packed gland seal apart from the stationary and rotating sealing rings for forming the fluid cavity.

Additionally, the invention provides a pump comprising a pump housing defining a fluid pumping chamber, an impeller located in the pumping chamber, a pump shaft carrying the impeller for rotating the impeller in the pumping chamber for pumping fluid through the pumping chamber, a shaft accommodating bore extending through the pump housing into the pumping chamber for accommodating the pump shaft into the pumping chamber, the pump shaft being axially movable in the shaft bore for adjusting an axial clearance gap between a face of the impeller and an adjacent face of the pump housing in the pumping chamber, and a shaft seal located in the shaft bore around the pump shaft for sealing the shaft bore from the pumping chamber, wherein the shaft seal is a shaft seal according to the invention.

Furthermore, the invention provides a pump comprising a pump housing defining a fluid pumping chamber, an impeller located in the pumping chamber, a pump shaft carrying the impeller for rotating the impeller in the pumping chamber for pumping fluid through the pumping chamber, a shaft accommodating bore extending through the pump housing into the pumping chamber for accommodating the pump shaft into the pumping chamber, the pump shaft being axially movable in the shaft bore for adjusting an axial clearance gap between a face of the impeller and an adjacent face of the pump housing in the pumping chamber, a stationary sealing ring mounted in the shaft bore and having a stationary sealing surface, a rotating sealing ring mounted on the pump shaft and having a rotating sealing surface for co-operating with the stationary sealing surface for forming a seal between the shaft bore and the pumping chamber, wherein the stationary and rotating sealing surfaces face in respective generally axial directions opposite to each other, and one of the stationary sealing ring and the rotating sealing ring is axially movable relative to the corresponding one of the pump housing and the pump shaft, and a means is provided for axially moving the movable one of the stationary sealing ring and the rotating sealing ring with the other of the stationary and the rotating sealing rings during axial movement of pump shaft and the pump housing relative to each other for adjusting the axial clearance gap in the pumping chamber between the impeller and the pump housing so that on the relative axial movement of the pump shaft and the pump housing for opening the axial clearance gap to the desired gap width, with the respective stationary and rotating sealing surfaces are brought into sealing relationship with each other.

In one embodiment of the invention, the pump is suitable for pumping abrasive type fluids.

In another embodiment of the invention, the pump is suitable for pumping slurry type fluids.

Figure 2:
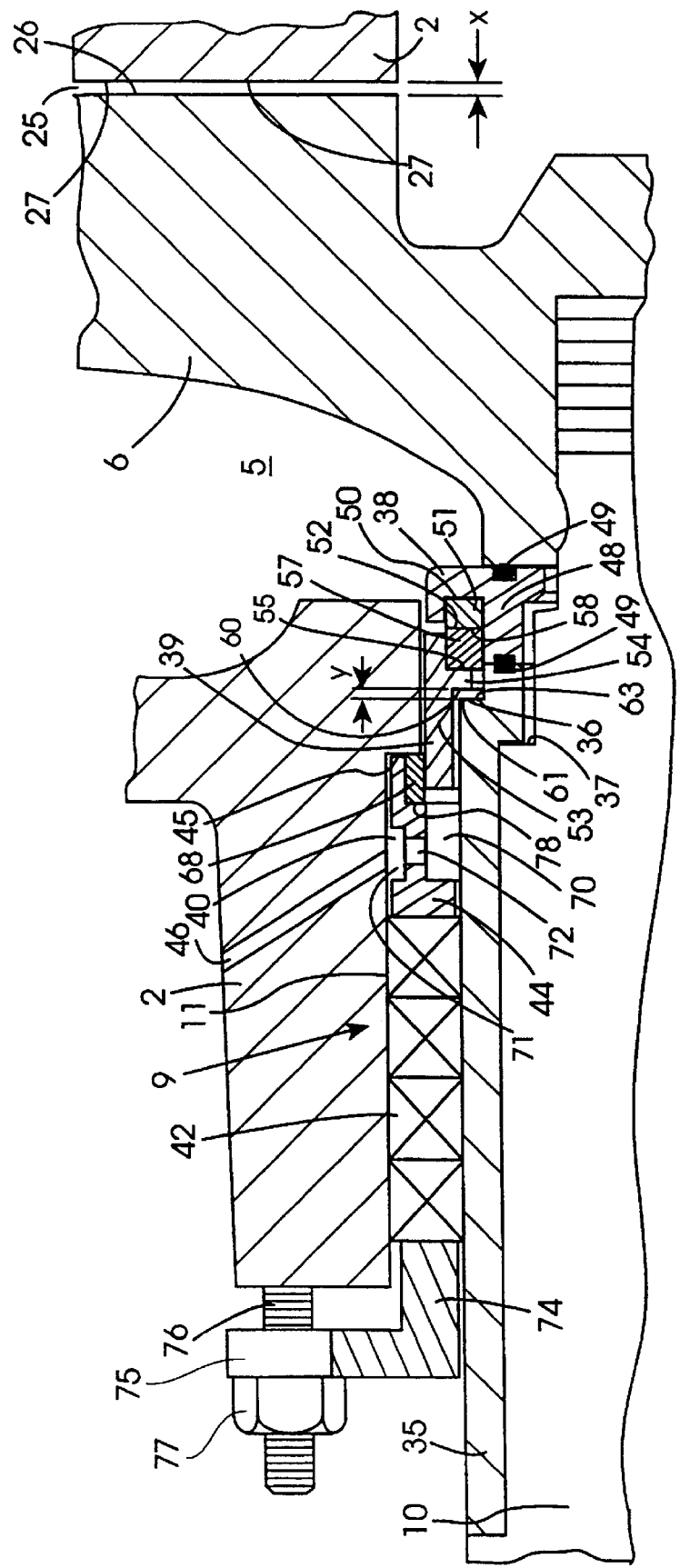
Figure 3:
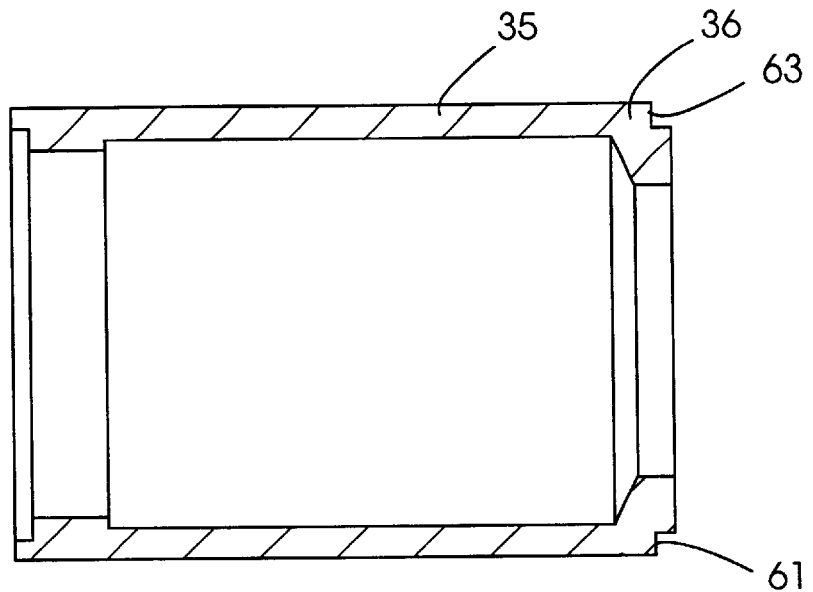
Figures 4, 5, 6:
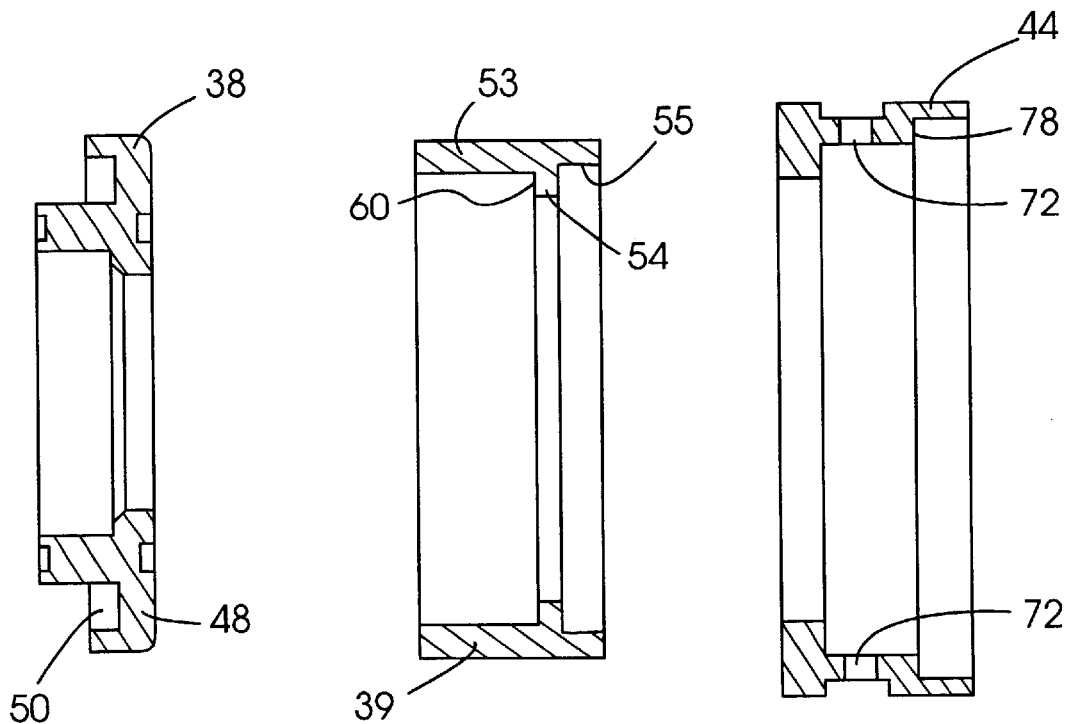

The invention will be more clearly understood from the following description of a preferred embodiment thereof, which is given by way of example only, with reference to the accompanying drawings, in which:

FIG. 1 is a cross-sectional side elevational view of a pump according to the invention, FIG. 2 is an enlarged cross-sectional side elevational view of a portion of the pump of FIG. 1, FIG. 3 is a cross-sectional side elevational view of a detail of the pump of FIG. 1, FIG. 4 is a cross-sectional side elevational view of another detail of the pump of FIG. 1, FIG. 5 is a cross-sectional side elevational view of another detail of the pump of FIG. 1, and FIG. 6 is a cross-sectional side elevational view of still another detail of the pump of FIG. 1.

Referring to the drawings, there is illustrated a pump according to the invention which is indicated generally by the reference numeral 1, and is of the type which is particularly suitable for pumping slurry type fluids, and in particular, abrasive slurry type fluids. The pump 1 comprises a pump housing 2, typically, of cast iron which defines a pumping chamber 5 within which an impeller 6 is rotatably mounted for pumping the slurry from an axial inlet port 7 to a radial outlet port 8. The impeller 6 is rigidly mounted on a pump shaft 10 which extends through a shaft accommodating bore 11 in the pump housing 2 from the pumping chamber 5. A shaft seal 9 also according to the invention located in the shaft bore 11 around the pump shaft 10 seals the shaft bore 11 from the pumping chamber 5. The seal 9 is described in detail below.

A carrier housing 12 mounted on a base 14 carries the pump housing 2 on a web 15. A shaft carrier sleeve 18 is located in a carrier bore 19 in the carrier housing 12 and rotatably carries the pump shaft 10 on bearings 20. The bearings 20 are retained in a bore 21 in the carrier sleeve 18 by circlips 22. An annular seal 23 is located in the bore 21 for preventing the ingress of liquid along the pump shaft 10 into the bearings 20. The shaft carrier sleeve 18 is a relatively tight fit in the carrier bore 19, but is axially slidable in the carrier bore 19 for facilitating axial movement of the pump shaft 10 for adjustment of an axial clearance gap 25 between an end face 26 of the impeller 6 and an adjacent end face 27 of the pump housing 2 within the pumping chamber 5. In this embodiment of the invention the adjacent end faces 26 and 27 extend radially relative to the rotational axis 24 of the pump shaft 10. The mounting of the pump shaft 10 within the shaft carrier sleeve 18 by the bearings 20 is such as to cause the pump shaft 10 to move axially with the shaft carrier sleeve 18. A lug 28 extends downwardly from the shaft carrier sleeve 18 and carries in a threaded bore (not shown) an adjusting screw 29 for facilitating adjustment of the axial clearance gap 25 in the event of wear. The adjusting screw 29 is rotatably engaged in the carrier housing 12 so that on rotation of the adjusting screw 29, the shaft carrier sleeve 18 is moved axially, and the axial direction of movement depends on the direction of rotation of the adjusting screw 29. The pump housing 2 is supported on the base 14 by a screw 30. Typically, the carrier housing 12, the base 14 and the web 15 are integrally cast all of iron. The web 15 is secured to the pump housing 2 by screws (not shown). The pump housing 2 is typically cast in two parts, which are secured together by screws (not shown) for facilitating disassembly of the pump 1 for removal of the impeller 6.

Before describing the seal 9, the operation of the adjusting screw 29 for adjusting the gap width "x" of the axial clearance gap 25 will first be described. Typically, the gap width "x" of the axial clearance gap 25 is ideally set just short of 1 mm. To set the axial clearance gap 25, the adjusting screw 29 is rotated for urging the shaft carrier sleeve 18 and in turn the pump shaft 10 and in turn the impeller 6 in the direction of the arrow A until the radial end face 26 of the impeller 6 abuts the radial end face 27 of the pump housing 2, thereby completely closing the axial. clearance gap 25. The adjusting screw 29 is then rotated in the reverse direction for urging the carrier sleeve 18, the pump shaft 10 and in turn the impeller 6 in the reverse direction, namely, in the direction of the arrow B for opening up the clearance gap 25. The adjusting screw 29 is rotated until the carrier sleeve 18 has been moved a distance in the direction of the arrow B corresponding to the desired gap width to which the axial clearance gap 25 is to be set, as mentioned above, just short of 1 mm. When the shaft carrier sleeve 18 has been moved through the appropriate distance in the direction of the arrow B, the axial clearance gap 25 is set at the desired gap width.

Returning now to the shaft seal 9, a sleeve 35 extends around and is a tight interference fit on the pump shaft 10 in the shaft bore 11. The sleeve 35 is stepped at 36 and engages a corresponding step 37 of the pump shaft 10. A rotating sealing ring 38 extends around and is rigidly carried on the pump shaft 10. The rotating sealing ring 38 co-operates with a stationary sealing ring 39 which is engaged in the shaft bore 11 for forming a seal between the pumping chamber 5 and a high pressure lubricating fluid cavity 40. Lubricating fluid, typically, water is maintained in the fluid cavity 40 at a positive pressure relative to the pressure of the slurry in the pumping chamber 5 for lubricating the rotating sealing ring 38 and the stationary sealing ring 39, and also for preventing the ingress of slurry past the respective rotating and stationary sealing rings 38 and 39. The downstream end of the fluid cavity 40 relative to the pumping chamber 5 is sealed by an annular packed gland seal 42 which forms with the rotating and stationary sealing rings 38 and 39, the sleeve 35 and the pump housing 2 the fluid cavity 40. A spacing means, namely a lantern ring 44 located in the shaft bore 11 engages a shoulder 45 in the shaft bore 11 for spacing the packed gland seal 42 from the rotating and stationary sealing rings 38 and 39. A charging port 46 extends through the pump housing 2 for accommodating the pressurised lubricating fluid into the fluid cavity 40.

The rotating sealing ring 38 comprises a rotating seal carrier ring 48 which extends around the pump shaft 10 and is clamped between the sleeve 35 and the impeller 6. A pair of O-ring seals 49 seal the interfaces between the rotating seal carrier ring 48 and the sleeve 35 and the impeller 6, respectively. An annular recess 50 in the rotating seal carrier ring 48 rigidly receives and retains a rotating ring seal 51 which defines an axially facing rotating sealing surface 52. The stationary sealing ring 39 comprises a stationary seal carrier ring 53 from which a circumferentially extending flange 54 extends inwardly therefrom. The flange 54 forms with the stationary seal carrier ring 53 an annular recess 55 for rigidly receiving and retaining a stationary ring seal 57 which defines an axially facing stationary sealing surface 58 for co-operating with the rotating sealing surface 52 for forming a seal between the pumping chamber 5 and the fluid cavity 40. The respective sealing surfaces 52 and 58, in this embodiment of the invention extend radially relative to the rotational axis 24 of the pump shaft 10. The stationary carrier ring 53 is tightly retained within the shaft bore 11 by a resilient annular sealing ring 68 for preventing rotation thereof, and for retaining the stationary carrier ring 53 in a desired axial location after adjustment of the gap 25, as will be described below. The annular sealing ring 68 is also described below.

A means for moving the stationary carrier ring 53 in the direction of the arrow A with the rotating carrier ring 48 when the pump shaft 10 is being moved in the direction of the arrow A for closing the axial clearance gap 25 comprises a pair of abutment means, in this case a pair of co-operating abutment surfaces, namely, an axially facing first abutment surface 60 and an axially oppositely facing second abutment surface 63. The first abutment surface 60 is formed by the circumferentially extending flange 54, and the second abutment surface is formed by a shoulder 61 on the sleeve 35 at the stepped diameter at 36. The first and second abutment surfaces 60 and 63, respectively, co-operate with each other for urging the stationary carrier ring 53 in the direction of the arrow A when the pump shaft 10 is being urged in the direction of the arrow A. Accordingly, as the pump shaft 10 is moved in the direction of the arrow A for closing the axial clearance gap 25, the stationary sealing ring 39 is moved with the rotating sealing ring 38. On reverse movement of the pump shaft 10 in the direction of the arrow B for opening the axial clearance gap 25 to the desired gap width "x", the respective sealing surfaces 52 and 58 of the rotating and stationary sealing rings 38 and 39, respectively, are urged into sealing engagement with each other. Thus, the axial clearance gap 25 can be adjusted without the need for disassembling the shaft seal 9, and any gap which may open up between the respective sealing surfaces 52 and 58 due to wear can be closed, and the sealing pressure between the sealing surfaces 52 and 58 can be adjusted during adjustment of the axial clearance gap 25.

In order to avoid excessive pressure between the respective rotating and stationary sealing surfaces 52 and 58 of the ring seals 51 and 57 a gap of width "y" is provided between the respective first and second abutment surfaces 60 and 63 when the respective sealing surfaces 52 and 58 are in sealing engagement. Initially, when the rotating ring seal 51 and the stationary ring seal 57 are new, the rotating carrier ring 48 and the stationary carrier ring 53 as well as the rotating ring seal 51 and the stationary ring seal 57 are dimensioned so that the gap width "y" between the respective first and second abutment surfaces 60 and 63 is as small as possible, and preferably just greater than zero when the respective sealing surfaces 52 and 58 are in sealing engagement. However, as the respective rotating and stationary sealing surfaces 52 and 58 commence to wear, in order for the respective sealing surfaces 52 and 58 to be in sealing engagement with each other, the gap width "y" between the first and second abutment surfaces 60 and 63 is increased after each adjustment. For so long as the gap width "y" when the respective rotating and stationary sealing surfaces 52 and 58 are in sealing engagement does not exceed the desired gap width "x" of the axial clearance gap 25, axial movement of the pump shaft 10 in the direction of the arrow B for opening the axial clearance gap 25 to the desired gap width "x" after the axial clearance gap 25 has been closed is sufficient for bringing the rotating and stationary sealing surfaces 52 and 58 into sealing engagement with each other. However, once the gap width "y" between the respective first and second abutment surfaces 60 and 63 when the rotating and stationary sealing surfaces 52 and 58, respectively, are in sealing relationship with each other becomes greater than the desired gap width "x" of the axial clearance gap 25, movement of the pump shaft 10 in the direction of the arrow B for opening the axial clearance gap 25 a distance equal to the value of the desired gap width "x" is insufficient for bringing the respective rotating and stationary sealing surfaces 52 and 58 into sealing relationship with each other. At that stage, the rotating and stationary ring seals 51 and 57 require replacement.

A gland ring 74 extends around the pump shaft 10 for packing the packed gland seal 42. A flange 75 extending circumferentially around the gland ring 74 engages studs 76 extending from the pump housing 2, and nuts 77 on the studs 76 are provided for tightening the gland ring 74 for packing the packed gland seal 42 against the lantern ring 44.

The resilient annular sealing ring 68 is of rubber, and is located between the shoulder 45 and a shoulder 78 on the lantern ring 44. The axial width and the radial thickness of the annular sealing ring 68 is such that as the lantern ring 44 is being urged towards the shoulder 45, as the packed gland seal 42 is being packed tightly by the gland ring 74, the radial thickness of the annular sealing ring 68 increases for tightly retaining the stationary carrier ring 53 in the desired axial position, and also for preventing rotation of the stationary carrier ring 53. The annular sealing ring 68 also prevents the ingress of the pressurised lubricating fluid between the stationary carrier ring 53 and the pump housing 2. The lantern ring 44 divides the fluid cavity 40 into an inner annular cavity 70 and an outer annular cavity 71. A pair of radially extending communicating bores 72 extending through the lantern ring 44 communicate the inner and outer cavities 70 and 71, respectively.

In use, when it is desired to adjust the axial clearance gap 25 between the impeller 6 and the pump housing 2, the gland ring 74 is released, and the packing of the packed gland seal 42 is removed, thereby slackening the resilient pressure of the annular sealing ring 68 on the stationary carrier ring 53, for permitting axial movement of the stationary carrier ring 53 in the bore 11. The adjusting screw 29 is rotated for urging the pump shaft 10 in the direction of the arrow A for closing the axial clearance gap 25. Initially, as the pump shaft 10 commences to move in the direction of the arrow A, the rotating and stationary sealing surfaces 52 and 58 begin to move out of engagement with each other, until the second abutment surface 63 engages the second abutment surface 60. At which stage further movement of the pump shaft 10 causes the stationary carrier ring 53 to move with the pump shaft 10. This simultaneous movement of the pump shaft 10 and the stationary carrier ring 53 continues until the axial clearance gap 25 has been closed. At that stage, the rotating and stationary sealing surfaces 52 and 58 are disengaged from each other, assuming there was initially a gap "y" between the first and second abutment surfaces 60 and 63. Once the axial clearance gap 25 is completely closed, the adjusting screw 29 is rotated in the reverse direction for moving the pump shaft 10 in the direction of the arrow B for opening the axial clearance gap 25 to the desired gap width "x". Initially as the pump shaft 10 commences to move in the direction of the arrow B, the first and second abutment surfaces 60 and 63, respectively, disengage each other and the stationary carrier ring 53 remains axially stationary. The stationary carrier ring 53 remains stationary until the rotating sealing surface 52 engages the stationary sealing surface 58. Thereafter, further movement of the pump shaft 10 in the direction of the arrow B causes the stationary carrier ring 53 to move in the direction of the arrow B with the rotating and stationary sealing surfaces 52 and 58, respectively, in sealing engagement with each other. The pump shaft 10 is moved axially in the direction of the arrow B until the axial clearance gap 25 is at the desired gap width "x". The rotating and stationary sealing surfaces 52 and 58 will be brought into sealing engagement with each other, and will remain so engaged, before or as the axial clearance gap 25 is approaching the desired gap width "x", provided that when the rotating and stationary sealing surfaces 52 and 58 are in sealing engagement, the width "y" of the gap between the first and second abutment surfaces 60 and 63 is less than or equal to the desired gap width "x" of the axial clearance gap 25. If it is desired to slacken the pressure between the rotating and stationary sealing surfaces 52 and 58, the pump shaft 10 may be moved slightly in the direction of the arrow A after the axial clearance gap 25 is at the desired gap width "x". Alternatively, the pump shaft 10 may be moved in the direction of the arrow B a distance just greater than the desired gap width "x", and then moved slightly in the direction of the arrow A to correct the gap width "x" of the axial clearance gap 25, thereby slackening the pressure between the rotating and stationary sealing surfaces 52 and 58. New packing to form the packed gland seal 42 is then inserted in the bore 11 around the pump shaft 10, and the gland ring 74 is replaced and tightened for tightening the packed gland seal 74 to the desired degree. The action of packing the packed gland seal 42 also urges the lantern ring 44 towards the shoulder 45 in the bore 11, which in turn tightens the annular sealing ring 68 for retaining the stationary carrier ring 53 in the desired axial position in the bore 11, and for preventing rotation of the stationary carrier ring 53.

With the axial clearance gap 25 at the desired gap width "x", and the rotating and stationary sealing surfaces 52 and 58 in sealing engagement, the pump 1 is ready for use.

Should the rotating and stationary sealing surfaces 52 and 58, respectively, of the rotating and stationary and sealing rings 38 and 39 wear to an undesirable state before it is necessary to adjust the axial clearance gap 25, wear of the rotating and stationary sealing surfaces 52 and 58, respectively, can be compensated for by carrying out an adjustment as already described of the axial clearance gap 25, even should this not be necessary.

The advantages of the invention are many. The invention provides a shaft seal which permits the use of a seal formed by respective rotating and stationary sealing rings between a positive pressure lubricating fluid cavity and the pumping chamber, in which the co-operating sealing surfaces of the respective rotating and stationary sealing rings are axially facing. The use of such seals with axially facing sealing surfaces is two fold. Firstly, the sealing efficiency of such seals when the respective axially facing sealing surfaces are brought into sealing engagement with each other is greater than that which can be achieved between seals which rely on circumferential radially facing sealing surfaces. In such seals which rely on circumferential radially facing sealing surfaces, a radial gap however small, in general, must be provided for permitting rotation of the shaft relative to the seal. In abrasive environments this radial gap tends to open relatively rapidly due to wear thus rendering the seal ineffective. The second advantage of seals with axially facing sealing surfaces as opposed to seals with radially extending sealing surfaces is that wear in the axially facing sealing surfaces can readily easily be compensated for by merely adjusting the respective rotating and stationary seals relative to each other. Such an adjustment facility is not readily available for seals which rely on circumferentially extending radially facing sealing surfaces with a radial gap therebetween.

Furthermore, the invention provides for adjustment of the sealing engagement between the respective axially facing sealing surfaces without the need for disassembling the shaft seal or the pump.

Additionally, the invention permits the use of such a seal with axially facing sealing surfaces without the need for disassembling the stationary and rotating seals each time adjustment of the axial clearance gap between the impeller and the pump housing is required. These advantages, and in particular the efficiency of the seal achieved by the rotating and stationary sealing rings provide for a relatively good seal between the positive pressure lubricating fluid cavity and the pumping chamber, thereby minimising, and in many cases, preventing the flow of slurry or other fluid in the pumping chamber into the fluid cavity, and thus further enhances the quality and the life of the packed gland seal. Furthermore, the efficiency of the seal achieved by the rotating and stationary sealing rings minimises the amount of lubricating fluid which passes into the pumping chamber.

A further advantage of the invention is that the seal according to the invention can be provided for retrofitting to an existing pump with the minimum amount of remachining of the pump housing and the pump shaft.

A further advantage of the invention is that it provides a seal which does not require a packed gland seal to be in direct proximity with the fluid being pumped through the pumping chamber.

While the respective end faces of the impeller and the pump housing which define the clearance gap have been described as being radially extending end faces, it will be readily apparent to those skilled in the art that the respective end faces may extend at an angle other than 90° relative to the rotational axis of the pump shaft, and in which case, the respective end faces would define frusto-cones.

It is envisaged that the respective rotating and stationary sealing surfaces 52 and 58, which have been described as extending generally radially relative to the rotational axis of the pump shaft, may extend at an angle other than 90° relative to the rotational axis of the pump shaft, and in which case, the respective rotating and stationary sealing surfaces would define respective frusto-cones.

What is claimed is:

1. A shaft seal (9) for a pump (1) of the type comprising a pump housing (2) defining a fluid pumping chamber (5), an impeller (6) located in the pumping chamber (5), a pump shaft (10) carrying the impeller (6) for rotating the impeller (6) in the pumping chamber (5) for pumping fluid through the pumping chamber (5), and a shaft accommodating bore (11) extending through the pump housing (2) into the pumping chamber (5) for accommodating the pump shaft (10) into the pumping chamber (5), the pump shaft (10) being axially movable in the shaft bore (11) for adjusting an axial clearance gap (25) between a face (26) of the impeller (6) and an adjacent face (2) of the pump housing (2) in the pumping chamber (5), the shaft seal (9) seal (9) comprising a stationary sealing ring (39) for mounting in the shaft bore (11) and having a stationary sealing surface (58), a rotating sealing ring (38) for mounting on the pump shaft (10) and having a rotating surface (52) for cooperating with the stationary sealing surface (58) for forming seal form the pumping chamber (5) between the pump shaft (10) and the pump housing (2) in the shaft bore (11), characterised in that the stationary and rotating sealing surfaces (58, 52) face in respective generally axial directions opposite to each other, and one of the stationary sealing ring (39) and the rotating sealing ring (38) is axially movable relative to the corresponding one of the pump housing (2) and the pump shaft (10), and a means (60, 63) is provided for axially moving the moveable one of the stationary sealing ring (39) and the rotating sealing ring (38) with the other of the stationary and the rotating sealing rings (39, 38) during axial movement of the pump shaft (10) and the pump housing (2) relative to each other in a direction for closing the axial clearance gap (25) in the pumping chamber (5) between the impeller (6) and the pump housing (2), so that on the relative axial movement of the pump shaft (10) and the pump housing (2) for opening the axial clearance gap (25) to the desired gap width (x), the respective stationary and rotating sealing surfaces (58, 52) are brought into sealing relationship with each other.

2. A seal as claimed in claim 1 characterised in that the means (60,63) for moving the movable one of the stationary sealing ring (39) and the rotating sealing ring (38) is provided for moving the movable sealing ring (38,39) a sufficient distance with the other sealing ring (38,39) so that on relative axial movement of the pump shaft (10) and the pump housing (2) to open the axial clearance gap (25) between the impeller (6) and the pump housing (2) to the desired gap width (x), the respective stationary and rotating sealing surfaces (39,38) are brought into the sealing relationship with each other.

3. A seal as claimed in claim 1 characterised in that the means (60,63) for moving the movable one of the stationary and rotating sealing rings (39,38) comprises respective first and second abutment means (60,63) for co-operating with each other for moving the movable one of the stationary and rotating seal rings (39,38) with the other sealing ring (39,38) on relative axial movement of the pump shaft (10) and the pump housing (2) for closing the axial clearance gap (25) between the impeller (6) and the pump housing (2), the first abutment means (60) being provided on the movable one of the stationary and rotating sealing rings (39,38), and the second abutment means (63) being located on the one of the pump housing (2) and the pump shaft (10) on which the other of the sealing rings (39,38) is mounted.

4. A seal as claimed in claim 1 characterised in that the stationary sealing ring (39) is axially movable in the shaft bore (11), and the first abutment means (60) defines an axially facing first abutment surface (60) on the stationary sealing ring (39), and the second abutment means (63) defines a second axially facing abutment surface (63) on the pump shaft (10) facing in the general direction of axial movement of the pump shaft (10) for closing the axial clearance gap (25) between the impeller (6) and the housing (2) for abutting the first abutment surface (60) when the pump shaft (10) is moved in the axial direction for closing the clearance gap (25) between the impeller (6) and the pump housing (2).

5. A seal as claimed in claim 4 characterised in that the first abutment surface (60) is defined by an annular flange (54) extending circumferentially around and inwardly from the stationary sealing ring (39), and the second abutment surface (63) extends circumferentially around the pump shaft (10), and is defined by a step change (36) in the diameter of the pump shaft (10).

6. A seal as claimed in claim 4 characterised in that the first and second abutment surfaces (60,63) are spaced apart, and the spacing (y) between the respective first and second abutment surfaces (60,63) when the stationary and rotating sealing surfaces (58,52) are in sealing relationship should not exceed the desired gap width (x) of the axial clearance gap (25) between the impeller (6) and the pump housing (2).

7. A seal as claimed in claim 1 characterised in that the stationary sealing ring (39) comprises a stationary seal carrier ring (53), and an annular stationary seal (57) mounted in the stationary seal carrier ring (53), and the rotating sealing ring (38) comprises a rotating seal carrier ring (48), and an annular rotating seal (51) mounted in the rotating seal carrier ring 48.

8. A seal as claimed in claim 1 characterised in that a packed gland seal (42) is provided for locating in the shaft bore (11) spaced apart from the stationary and rotating sealing rings (39,38), the packed gland seal (42) defining with the pump housing (2), the pump shaft (10) and the stationary and rotating sealing rings (39,38) an annular fluid cavity (40) for a lubricating fluid for lubricating the stationary and rotating sealing surfaces (58,52) of the respective stationary and rotating sealing rings (39,38), the annular fluid cavity (40) being located on the downstream side of the stationary and rotating sealing rings (39,38) relative to the pumping chamber (5), and an access means (46) is provided for pressurising the lubricating fluid in the fluid cavity (40) so that the lubricating fluid has a positive pressure relative to the fluid in the pumping chamber (5).

9. A pump (1) comprising a pump housing (2) defining a fluid pumping chamber (5), an impeller (6) located in the pumping chamber (5), a pump shaft (10) carrying the impeller (6) for rotating the impeller (6) in the pumping chamber (5) for pumping fluid through the pumping chamber (5), a shaft accommodating bore (11) extending through the pump housing (2) into the pumping chamber (5) for accommodating the pump shaft (10) into the pumping chamber (5), the pump shaft (10) being axially movable in the shaft bore (11) for adjusting an axial clearance gap (25)

between a face (26) of the impeller (6) and an adjacent face (27) of the pump housing (2) in the pumping chamber (5), a stationary sealing ring (39) mounted in the shaft bore (11) and having a stationary sealing surface (58), a rotating sealing ring (38) mounted on the pump shaft (10) and having a rotating sealing surface (52) for co-operating with the stationary sealing surface (58) for forming a seal between the shaft bore (11) and the pumping chamber (5), characterised in that the stationary and rotating sealing surfaces (58, 52) face in respective generally axial directions opposite to each other, and one of the stationary sealing ring (39) and the rotating sealing ring (38) is axially movable relative to the corresponding one of the pump housing (2) and the shaft (10), and a means (60, 63) is provided for axially moving the movable one of the stationary sealing ring (39) and the rotating sealing ring (38) with the other of the stationary and the rotating sealing rings (39, 38) during axial movement of the pump shaft (10) and the pump housing (2) relative to each other in the direction for closing the axial clearance gap (25) in the pumping chamber (5) between the impeller (6) and the pump housing (2), so that on the relative axial movement of the pump shaft (10) and the pump housing (2) for opening the axial clearance gap (25) to the desired gap width (x), the respective stationary and rotating sealing surfaces (58, 52) are brought into sealing relationship with each other.

10. A pump as claimed in claim 9 characterised in that the means (60,63) for moving the movable one of the stationary sealing ring (39) and the rotating sealing ring (38) is provided for moving the movable sealing ring (38,39) a sufficient distance with the other sealing ring (38,39) so that on relative axial movement of the pump shaft (10) and the pump housing (2) to open the axial clearance gap (25) between the impeller (6) and the pump housing (2) to the desired gap width (x), the respective stationary and rotating sealing surfaces (39,38) are brought into the sealing relationship with each other.

11. A pump as claimed in claim 9 characterised in that the means (60,63) for moving the movable one of the stationary and rotating sealing rings (39,38) comprises respective first and second abutment means (60,63) for co-operating with each other for moving the movable one of the stationary and rotating seal rings (39,38) with the other sealing ring (39,38) on relative axial movement of the pump shaft (10) and the pump housing (2) for closing the axial clearance gap (25) between the impeller (6) and the pump housing (2), the first abutment means (60) being provided on the movable one of the stationary and rotating sealing rings (39,38), and the second abutment means (63) being located on the one of the pump housing (2) and the pump shaft (10) on which the other of the sealing rings (39,38) is mounted.

12. A pump as claimed in claim 9 characterised in that the stationary sealing ring (39) is axially movable in the shaft bore (11), and the first abutment means (60) defines an axially facing first abutment surface (60) on the stationary sealing ring (39), and the second abutment means (63) defines a second axially facing abutment surface (63) on the pump shaft (10) facing in the general direction of axial movement of the pump shaft (10) for closing the axial clearance gap (25) between the impeller (6) and the housing (2) for abutting the first abutment surface (60) when the pump shaft (10) is moved in the axial direction for closing the clearance gap (25) between the impeller (6) and the pump housing (2).

13. A pump as claimed in claim 12 characterised in that the first and second abutment surfaces (60,63) are spaced apart, and the spacing (y) between the respective first and second abutment surfaces (60,63) when the stationary and rotating sealing surfaces (58,52) are in sealing relationship should not exceed the desired gap width (x) of the axial clearance gap (25) between the impeller (6) and the pump housing (2).

14. A pump as claimed in claim 12 characterised in that the first abutment surface (60) is defined by an annular flange (54) extending circumferentially around and inwardly from the stationary sealing ring (39), and the second abutment surface (63) extends circumferentially around the pump shaft (10), and is defined by a step change (36) in the diameter of the pump shaft (10).

15. A pump as claimed in claim 9 characterised in that the stationary sealing ring (39) comprises a stationary seal carrier ring (53), and an annular stationary seal (57) mounted in the stationary seal carrier ring (53), and the rotating sealing ring (38) comprises a rotating seal carrier ring (48), and an annular rotating seal (51) mounted in the rotating seal carrier ring (48).

16. A pump as claimed in claim 9 characterised in that a packed gland seal (42) is provided for locating in the shaft bore (11) spaced apart from the stationary and rotating sealing rings (39,38), the packed gland seal (42) defining with the pump housing (2), the pump shaft (10) and the stationary and rotating sealing rings (39,38) an annular fluid cavity (40) for a lubricating fluid for lubricating the stationary and rotating sealing surfaces (58,52) of the respective stationary and rotating sealing rings (39,38), the annular fluid cavity (40) being located on the downstream side of the stationary and rotating sealing rings (39,38) relative to the pumping chamber (5), and an access means (46) is provided for pressurising the lubricating fluid in the fluid cavity (40) so that the lubricating fluid has a positive pressure relative to the fluid in the pumping chamber (5).

17. A pump as claimed in claim 9 characterised in that the pump (1) is suitable for abrasive or slurry type fluids.

* * * * *